United States Patent
Srikantan et al.

(10) Patent No.: US 6,857,130 B2
(45) Date of Patent: Feb. 15, 2005

(54) RESYNCHRONIZING MEDIA DURING STREAMING

(75) Inventors: Geetha Srikantan, Palo Alto, CA (US); Aravind Narasimhan, New York, NY (US); Seth Proctor, Concord, MA (US); Jan Brittenson, San Francisco, CA (US); Matthew Shafer, San Jose, CA (US); Jonathan S. Sergent, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 571 days.

(21) Appl. No.: 09/827,865

(22) Filed: Apr. 6, 2001

(65) Prior Publication Data

US 2002/0010917 A1 Jan. 24, 2002

Related U.S. Application Data

(60) Provisional application No. 60/195,754, filed on Apr. 8, 2000.

(51) Int. Cl.$^7$ .............................................. H04N 7/173
(52) U.S. Cl. ......................... 725/93; 725/116; 709/231
(58) Field of Search ............................. 725/92, 91, 93, 725/94, 114, 115, 116, 135–138, 143–144, 146–147; 348/512, 423.1, 515, 518; 709/231, 203

(56) References Cited

U.S. PATENT DOCUMENTS 5,420,801 A * 5/1995 Dockter et al. ............. 345/501
5,737,531 A 4/1998 Ehley
5,751,280 A 5/1998 Abbott et al.

FOREIGN PATENT DOCUMENTS

EP 0-817-489 A2 1/1998

OTHER PUBLICATIONS

Rangan, et al., "Feedback Techniques for Continuity and Synchronization in Multimedia Information Retrieval," ACM Transactions on Information Systems, vol. 13, No. 2, Aplril 1995, pp. 145–176.*
Biersack, et al., "Intra– and Inter–Stream Synchronisation for Stored Multimedia Streams," IEEE Int'l. Conference on Multimedia Computing & Systems, Jun. 17–23, 1996, pp. 372–381.*

* cited by examiner

*Primary Examiner*—Chris Grant
*Assistant Examiner*—Brian Shelton
(74) *Attorney, Agent, or Firm*—Park, Vaughan & Fleming LLP (57) ABSTRACT

A system and method are provided for resynchronizing a media stream. A media streaming server receives live or pre-recorded media for streaming to clients. When media is not received or available for streaming at the appropriate media time index, the media stream is deemed to be out of synchronization. The server selects a future time index at which to resynchronize the stream and may discard intervening media. Media corresponding to the new time index is requested or retrieved and, if available at the new time index, media streaming resumes in synchronization. If media corresponding to the new time index is not available, the server may select another future time index and try again to resynchronize. Resynchronization may be attempted a configurable number of times and, if unsuccessful, the server may terminate the stream.

24 Claims, 6 Drawing Sheets

RESYNCHRONIZING MEDIA DURING STREAMING

RELATED APPLICATION

This application claims the benefit of U.S. Provisional Application No. 60/195,754, filed Apr. 8, 2000.

BACKGROUND

This invention relates to the field of computer systems. More particularly, a system and methods are provided for resynchronizing a media stream to a client.

Media streaming systems are designed to stream media programs and events, which may be pre-recorded or live, to client devices (e.g., computers, media players). A client can play a media stream as it is received (i.e., before the stream is complete), thereby allowing fast, or even real-time, enjoyment of the media program or event.

Streamed media is often composed of multiple tracks. For example, an audiovisual program generally includes at least one audio track and at least one video track. Each track includes media of the appropriate type (e.g., audio, video), and may also include metadata that is used to stream the media correctly. A track's metadata may include information for identifying a media segment or sample (or other unit of media) that should be played for a given time index within the program, for determining where that segment or sample is located in the file, etc. A media track's metadata may thus be used by a media streaming server to stream the media track in the correct sequence, with appropriate timing, and so on.

When streaming a media track or program to multiple clients, existing systems usually store separate copies of each track's metadata for each client. More specifically, from a media file containing the media to be streamed, these systems repeatedly extract and store the metadata each time a new client requests the media. When serving a large number of clients, this could require a significant amount of the server's resources (e.g., memory, processor, disk usage), and may limit the number of clients the server can support.

Also, some existing systems typically allocate just one file descriptor, to be shared among all clients receiving a particular media stream, for accessing the media file containing the media being streamed. This can lead to a great deal of contention among the client streams as each one attempts to seek to (i.e., find) and extract a different media segment or sample.

Yet further, when streaming a multi-track media program to a client, existing media streaming systems attempt to maintain synchronization between the tracks so that the appropriate corresponding track media is streamed or played for each time unit of the program, but may be incapable of regaining synchronization if it is lost. For example, if the media for one track is received (e.g., from a storage device) at a slower rate than the media for another track, an existing media streaming system may simply continue streaming the media, even if the tracks get further and further out of synchronization. Other systems may simply halt a media stream if synchronization is lost, without attempting to correct the situation.

SUMMARY

Therefore, in one embodiment of the invention, a system and methods are provided for synchronizing or resynchronizing the streaming of a media program or presentation, which may include multiple tracks.

In this embodiment, a media streaming server may determine that a streamed media program is out of synchronization if media data for one or more tracks of the program are not available for streaming at the corresponding media time index. If, for example, a source such as a media storage device cannot supply media fast enough, the time index corresponding to media that is available for streaming may lag behind the current time index of the media program (i.e., the time index of the program for which media should be streamed). In this embodiment, the media streaming server may drop the stale data when the loss of synchronization is detected, and attempt to resynchronize the media stream at a later time index.

In particular, the media streaming server may select a future media time index and request or attempt to retrieve media data corresponding to the later index. If the media is available by the time the new index is reached, the media stream may be resumed. Otherwise, the server may attempt to resynchronize a threshold number of times before halting or terminating the stream.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a computer server configured to provide data or media streaming services to computers or communications devices of virtually any configuration (e.g., wired, wireless, portable, desktop). Details of such computers and other devices (e.g., processor, memory, data storage, display) are well known and may be omitted for the sake of clarity. Further, embodiments of the invention are described as they may be implemented in an object-oriented programming environment. Suitable variations of embodiments may be implemented using other programming models or frameworks, as will be appreciated by one skilled in the art.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention a media streaming server is configured to detect the loss of synchronization within a stream of media. For example, when media for one track of a media program is not being streamed fast enough to keep pace with the overall program, the server detects this and attempts to resynchronize the stream. Illustratively, a media stream may be considered to be out of synchronization when the current media time (e.g., the time index within the media program at which the server should be streaming media) differs from the media time index of media (for one or more tracks) that is actually being streamed or that is available for streaming. The server then attempts to resynchronize the media tracks, possibly multiple times, by stepping ahead in the media program to a later time index, requesting media that corresponds to the later time index, and attempting to resume streaming from the new time index.

The media streaming server may test for, or determine, the loss of synchronization when media that it needs to stream for a given track is not received at an expected rate or is not received in time to be streamed at its corresponding time index. The media may, for example, be stored on a local storage device, in which case the server may schedule portions of the media to be retrieved as needed for streaming. Alternatively, the media may be received from another source, such as a live media feed. If the media is not received as expected, the server may then compare the time index of the track media that is being streamed, or that is ready to be streamed, with the current time index of another track or the entire media program.

When the server attempts to resynchronize by advancing the media time index, it also schedules or requests retrieval of a sufficient amount of media to allow resynchronized streaming at that index. If the necessary media is not available when the server is to resume streaming, it may attempt another resynchronization by advancing to another future media time index and requesting the media that would be streamed at that index.

Specific embodiments of the invention are described below as they may be implemented for streaming Quick-Time media from a UNIX-based computer system, such as a system executing the Solaris™ operating system by Sun Microsystems, Inc. Such embodiments may be modified for use with other types of media and other computer systems, as may be understood from the following descriptions.

An Illustrative Media Streaming Server

Media streaming allows a user to receive and enjoy media content without having to wait until the full program or presentation is downloaded to his or her client device. For example, the user can enjoy a pre-recorded program, or experience a live event in real-time, without waiting until the full program is received.

Media may be streamed in unicast or multicast mode. In unicast mode the streaming server maintains a dedicated connection to each receiving client device, which grants a user great control over his or her stream. He or she may, for example, be able to pause a stream, rewind or fast-forward through the streamed media, or perform other control functions. However, this can lead to inefficient use of bandwidth for a large number of users. In multicast mode, the media streaming server streams a program to multiple users simultaneously, thereby using less bandwidth. This type of streaming is thus comparable to a traditional broadcast, and users have little control over their individual streams. Live events may normally be streamed in multicast mode, because it is more efficient for serving large numbers of users. And, because it is a live event being enjoyed in real-time, there is little need to manipulate the streamed media.

A media streaming server according to a present embodiment of the invention may operate in a "reflection" mode of operation, in which the server receives a media stream from another streaming system or server (usually in multicast mode), and forwards the media to one or more users (in unicast or multicast mode).

Streaming real-time media places constraints upon the issuing server, because delivery of each frame or other unit of the media must be performed in a specified order and within a certain period of time. Thus, despite the number of clients it serves, a media streaming server must strive to meet the demands of streaming real-time media so that the quality of service to the users does not drop to an unacceptable level. For example, regardless of the type of program (i.e., live or pre-recorded) and mode of streaming (i.e., unicast or multicast), streamed media is generally compressed to decrease the bandwidth that it consumes in transit, thus helping to ensure timely delivery of media to a client.

A media streaming server according to one embodiment of the invention is configured to stream QuickTime media and/or other forms of media, in a unicast or multicast mode, over a proprietary or publicly accessible network such as the Internet. Media streams are formatted according to a set of protocols compatible with the transmission medium. In particular, when streaming QuickTime media the server may be configured for RTSP (Real-Time Streaming Protocol) to facilitate a client's control of a media stream, RTP (Real-Time Transport Protocol) to deliver the stream to the client and/or receive media from another source, RTCP (Real-Time Transport Control Protocol) to receive or exchange information regarding the quality of a stream, SDP (Session Description Protocol) to describe media to the client, etc. Other embodiments may be configured for other media protocols.

Figure 1:
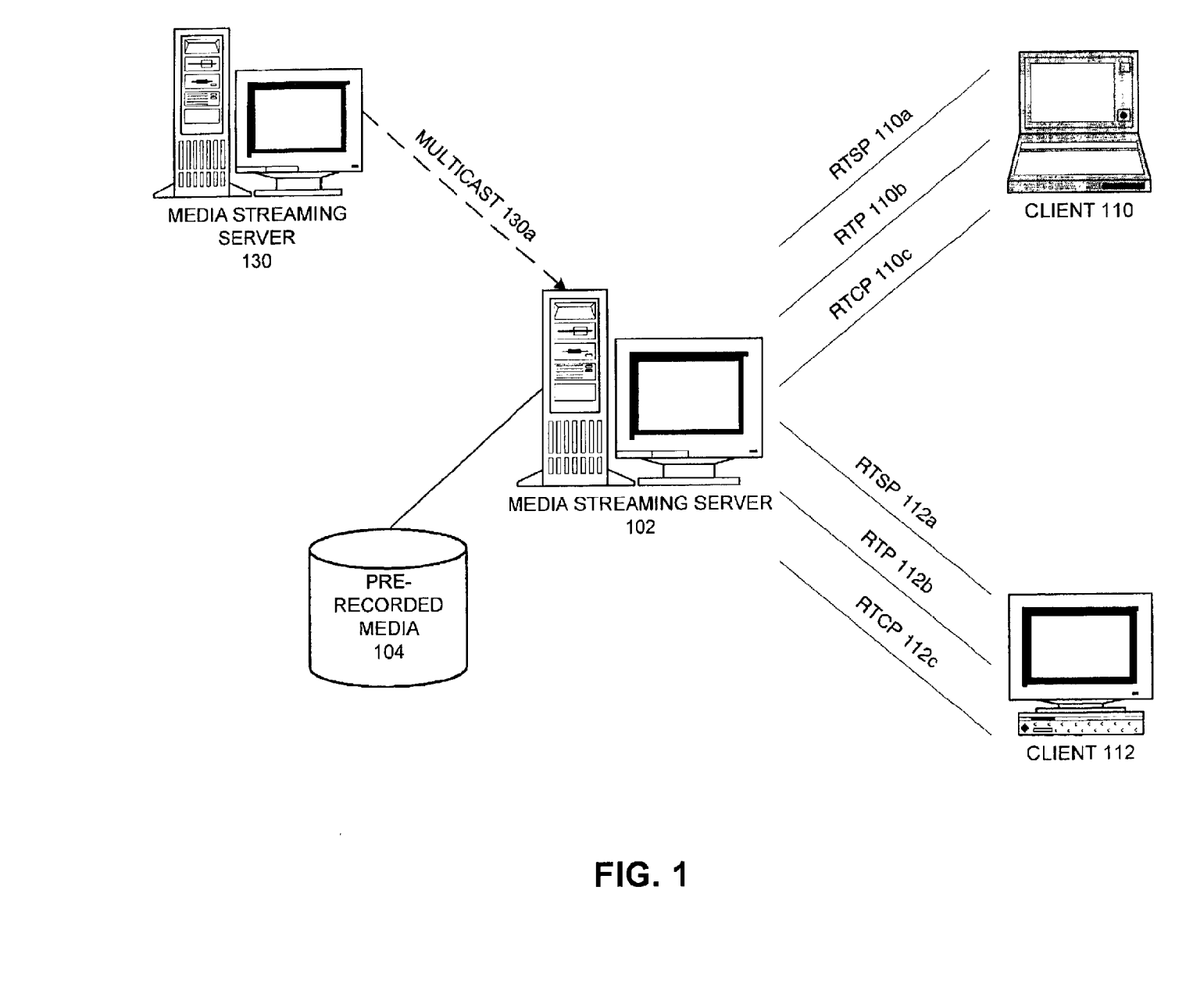
FIG. 1 is a block diagram depicting a server configured to stream media in accordance with an embodiment of the present invention.

FIG. 1 depicts media streaming server 102, configured to stream QuickTime media according to an embodiment of the invention. In FIG. 1, media streaming server 102 serves clients 110, 112. The media that is streamed to the clients may comprise a pre-recorded program retrieved from storage device 104 or a real-time program received from server 130 (e.g., as part of multicast broadcast 130a). Media streaming server 102 may thus stream live events (e.g., concerts, news broadcasts, sporting events), movies, documentaries, training videos, educational programs or classes, etc.

Media streaming may require multiple connections between media streaming server 102 and a client. In the embodiment illustrated in FIG. 1, a first connection is made for RTSP (e.g., connection 110*a*, connection 112*a*) to allow a client to control a media stream. In particular, a client uses an RTSP connection to send commands to the media streaming server. The media stream commands that a client may submit to the server in this embodiment include commands such as Options, to receive a list of supported commands; Describe, to prompt the server to describe a media program; Setup, to identify desired tracks it would like to receive (wherein each track may be a different media form, such as video, audio, etc.); Play, to play a media track or program; Pause, to temporarily stop streaming; Teardown, to end a stream; etc. Thus, client 110 may, for example, establish RTSP connection 110*a* with server 102 and issue the Describe command to receive a description of the content and tracks available for streaming. Client 110 may then submit a Setup request for one or more tracks.

When a client issues a Setup command to the server, the server establishes an RTP connection (e.g., connection 110*b*, connection 112*b*) and an RTCP connection (e.g., connection 110*c*, connection 112*c*) for the selected track(s). When the Play command is received, the server starts streaming media packets to the client through the RTP connection. And, the server and client may exchange RTCP packets, through the RTCP connection, that describe the quality of the stream. When a Teardown command is issued, the server closes its related stream connections with the issuing client.

The various connections employed by the media streaming server may utilize TCP (Transport Control Protocol) sockets for a compatible communication medium through which the server and a client communicate (e.g., the Internet). In other embodiments of the invention, the sockets may be configured according to a different protocol (e.g., HTTP—HyperText Transport Protocol, FTP—File Transfer Protocol).

As already described, media streaming server 102 of FIG. 1 may stream real-time or live media to clients and may also stream pre-recorded media. Further, in the reflection mode of operation, the media streaming server may redirect to clients media that it receives from another entity, such as a live event, a video camera, a broadcast from another server (e.g., server 130), etc. In this situation media streaming server 102 acts as a client and receives media packets via an RTP connection established with the entity.

Clients 110, 112 are equipped with suitable media players for playing the media streamed from media streaming server 102. For QuickTime media streaming, the clients may operate a QuickTime player such as that available from Apple Computer, Inc. Client computing devices may operate virtually any operating system for which a suitable media player is available (e.g., Solaris, Mac OS, Windows, Linux). Because client devices may have relatively low-bandwidth communication capability (e.g., 56K modem), media streams may be sent with relatively low bit-rates. Higher bit-rates may, of course, be implemented for more robust clients. Clients may identify media to be streamed to them by submitting a URL (Uniform Resource Locator), file name, program name (e.g., name of a movie, song title), etc.

U.S. patent application Ser. No. 09/828,052, filed on Apr. 6, 2001 and entitled "Method and Apparatus for Handling Events Received at a Server Socket," discloses a configuration of media streaming server 102 for streaming media to multiple clients through a limited number of communication sockets, and is hereby incorporated by reference.

Streaming Media to Multiple Clients with a Single File Track

In one embodiment of the invention, a media streaming server streams media that is accompanied by metadata to facilitate the streaming process. For example, metadata for a QuickTime media track may indicate which unit or piece of media (e.g., audio sample, movie segment) corresponds to a given time index within the media's program, and where to find it within a media file. In this embodiment, the metadata may be assembled (e.g., extracted from one or more media files for a given media track) just once, but may be used to facilitate streaming of that track to multiple clients. This scheme is thus more efficient than existing streaming systems in which separate copies of the metadata are assembled for each individual client stream.

The media data, once extracted with the help of the metadata, is placed into RTP packets and streamed to the clients. The media data may be prepared for streaming in virtually any format that can be handled by a client. In particular, the media may be placed into packets without altering its coding, compression or other attributes.

Illustratively, a client may request a media stream comprising multiple tracks, or may individually request specific tracks. Each track has its own metadata and may be sent to a client as a separate stream (i.e., multiple tracks may or may not be combined into a single stream). As described above, in one embodiment of the invention the media is sent in RTP packets, in which case the streaming may be controlled by a client via RTSP commands and the quality of a stream may be reported via RTCP. In other embodiments of the invention, other suitable protocols are employed.

When the media streaming server is operating in a reflection mode, in which it receives media (as RTP packets) from a source and streams them to clients, metadata for the media may be received with or in advance of the media.

Figure 2:
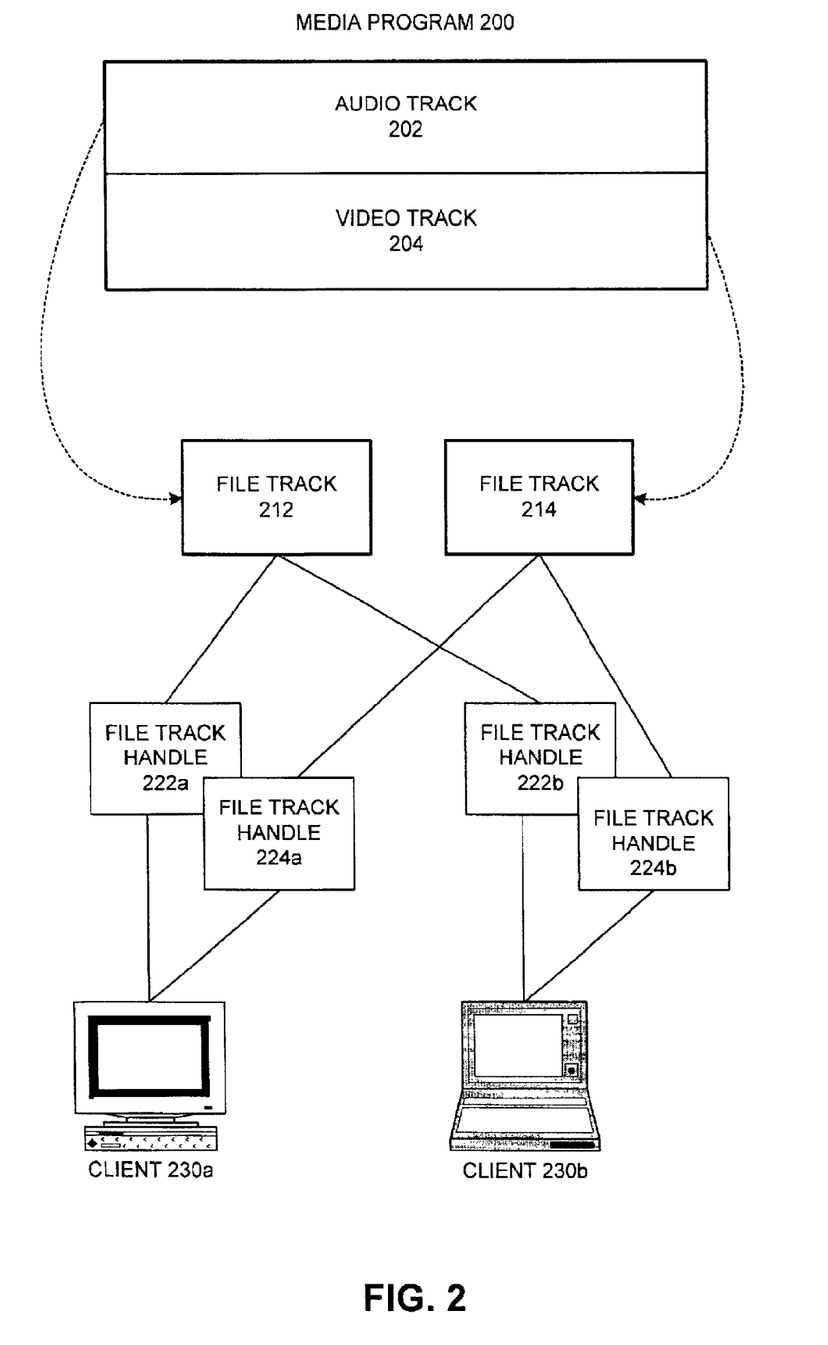
FIG. 2 is a block diagram depicting the use of a single copy of media track metadata to stream the media to multiple clients, in accordance with an embodiment of the invention.

FIG. 2 depicts the use of a singleton file track and multiple file track handles to stream a media track to multiple clients without separately extracting or making separate copies of the track's metadata, according to one embodiment of the invention.

In the illustrated embodiment, media program 200 includes audio track 202 and video track 204. Each track includes its indicated type of media for the program (i.e., audio, video) and metadata that, among other things: identifies which media unit (e.g., audio sample, video frame) corresponds to a given time index in the media program; identifies which chunk (e.g., collection of media units) a given unit belongs to or is included in; lists the media units within a given chunk; identifies where a given chunk or media unit is stored within media program file 200; includes edit tables that allow content tools to insert or delete parts of tracks without copying or compacting the entire track (e.g., they allow a track to be fragmented); etc. Illustratively, audio track 202 and video track 204 are stored as separate files (or sets of files). Alternatively, however, different types of tracks or portions of different types of tracks may be stored in a single file.

A media track's metadata may be stored contiguously within the file(s) containing the track's media, may be distributed throughout the track's media file(s), or may even be stored as a separate track.

In accordance with this embodiment of the invention, each track's metadata is extracted and stored in separate file tracks. Thus, the metadata for audio track 202 is assembled as file track 212, while the metadata for video track 204 is stored in file track 214. The different types of metadata within a track may be stored as separate tables, lists, or other data structures.

For each client that a track of the media program is being streamed to, separate file track handles are established. Thus, for client 230*a*, file track handles 222*a*, 224*a* are established for accessing the metadata of file track 212 and 214, respectively. Similarly, for client 230*b* the metadata stored in file track 212 for audio track 202 is accessed by file track handle 222*b*, while the metadata of file track 214 for video track 204 is accessed by file track handle 224*b*. Illustratively, each file track handle includes one or more pointers or other references into the associated file track, with which to access the various types of information.

In addition, each file track handle, or set of file track handles for a given client stream, may be allocated a separate file descriptor for accessing the media file(s) that store a track's media. Thus, in the embodiment of FIG. 2, in which audio track 202 and video track 204 are stored in separate files, each of file track handles 222*a*, 222*b*, 224*a*, 224*b* is allocated its own file descriptor for locating and extracting media for streaming.

While streaming media to a client (e.g., after the client requests a track or program be played), the file track handles for the client's stream access the file tracks to determine the proper sequence of media (i.e., the media unit(s) to stream for each time index of the media). With this information, the file track handles extract the media from the media file(s) so that it can be placed into RTP packets (or packets configured according to another suitable protocol) and streamed to the client via an RTP connection. When a client terminates its stream, the file track handles are deleted.

In one embodiment of the invention, a file track is configured to monitor the number of file track handles maintaining references to it. In this embodiment, when all client streams of the related media track have been terminated, the file track may remove itself and thereby free additional resources for other processes or media tracks.

Figure 3:
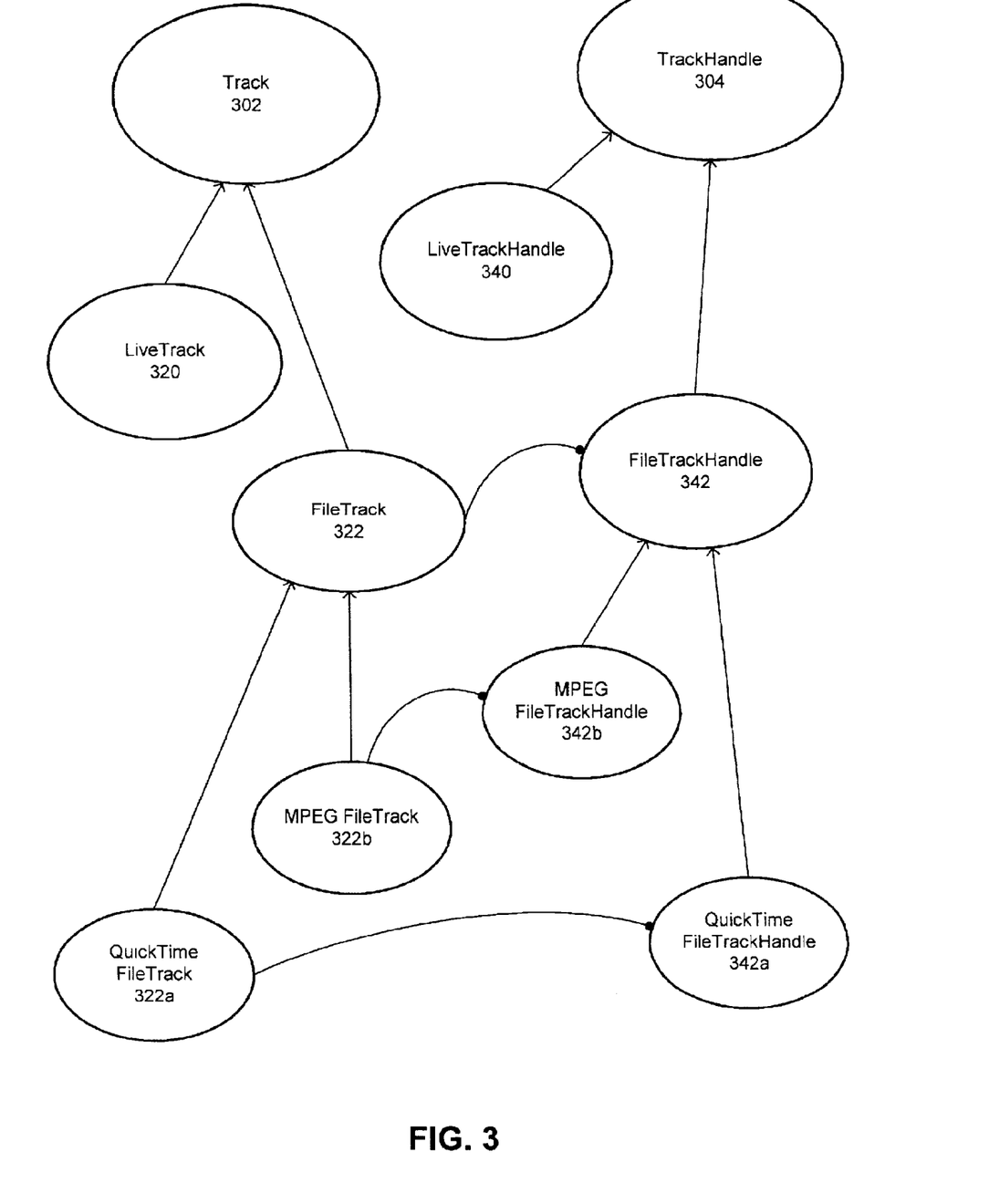
FIG. 3 depicts one configuration of program objects cooperating to stream a media track to multiple clients with a single copy of the track's metadata, in accordance with an embodiment of the present invention.

FIG. 3 depicts several program objects employed in one embodiment of the invention. Appropriate corresponding program modules configured to operate similarly to the illustrated program objects may be generated for computer systems with non-object oriented methods of programming.

In this embodiment, Track 302 represents a class of objects configured to assemble metadata for a media track and allow multiple file track handles to use the metadata on behalf of different client streams. Multiple types of Track objects may be generated from Track 302, such as LiveTrack 320 for assembling metadata for streaming live or real-time event media, and FileTrack 322 for assembling metadata for stored or pre-recorded media. In one alternative embodiment of the invention, one type of track object (e.g., FileTrack 322) may be configured to facilitate streaming of both pre-recorded and live media. In yet another alternative embodiment, live media may not be in the form of tracks and may therefore be served to clients in some other manner.

QuickTime FileTrack 322*a* and MPEG FileTrack 322*b* represent FileTrack objects configured to handle metadata for two specific media forms (i.e., QuickTime and MPEG). Objects generated from Track 302 may inherit attributes and methods useful for handling live media, pre-recorded media, and/or other media. Among the inherited attributes, for example, may be one that keeps a count of track handles that reference a given track.

TrackHandle 304 represents a class of objects configured to facilitate the streaming of track media to a client using a shared collection of track metadata. Illustratively, LiveTrackHandle 340 represents a class of TrackHandle objects configured for streams of live media, while File-TrackHandle 342 represents a class of TrackHandle objects configured for pre-recorded or other stored media. In one alternative embodiment of the invention, one type of track handle object (e.g., FileTrackHandle 342) may be configured for streaming of both pre-recorded and live media. In yet another alternative embodiment, live media may not take the form of a track and may therefore be served to clients in some other manner than described herein.

From FileTrackHandle 342, different types of FileTrack-Handle objects may be instantiated for specific forms of media, such as QuickTime FileTrackHandle 342*a* for Quick-Time media and MPEG FileTrackHandle 342*b* for MPEG media.

In this embodiment of the invention, each TrackHandle object derived from TrackHandle 304 includes suitable methods for moving to a certain time index in a media program or track, reading media data into a buffer (for streaming to a client), etc. Thus, TrackHandle objects maintain state information regarding a client's current play position in a media track, and may include one or more buffers for sending media packets to clients and one or more pointers or references to their corresponding Track objects for accessing metadata.

Once a FileTrack object is established for a given media track, subsequent client requests for that track use the established FileTrack rather than assembling the track's metadata again. Thus, FileTrack objects may be configured to instantiate new FileTrackHandle objects for new client streams.

Figure 4:
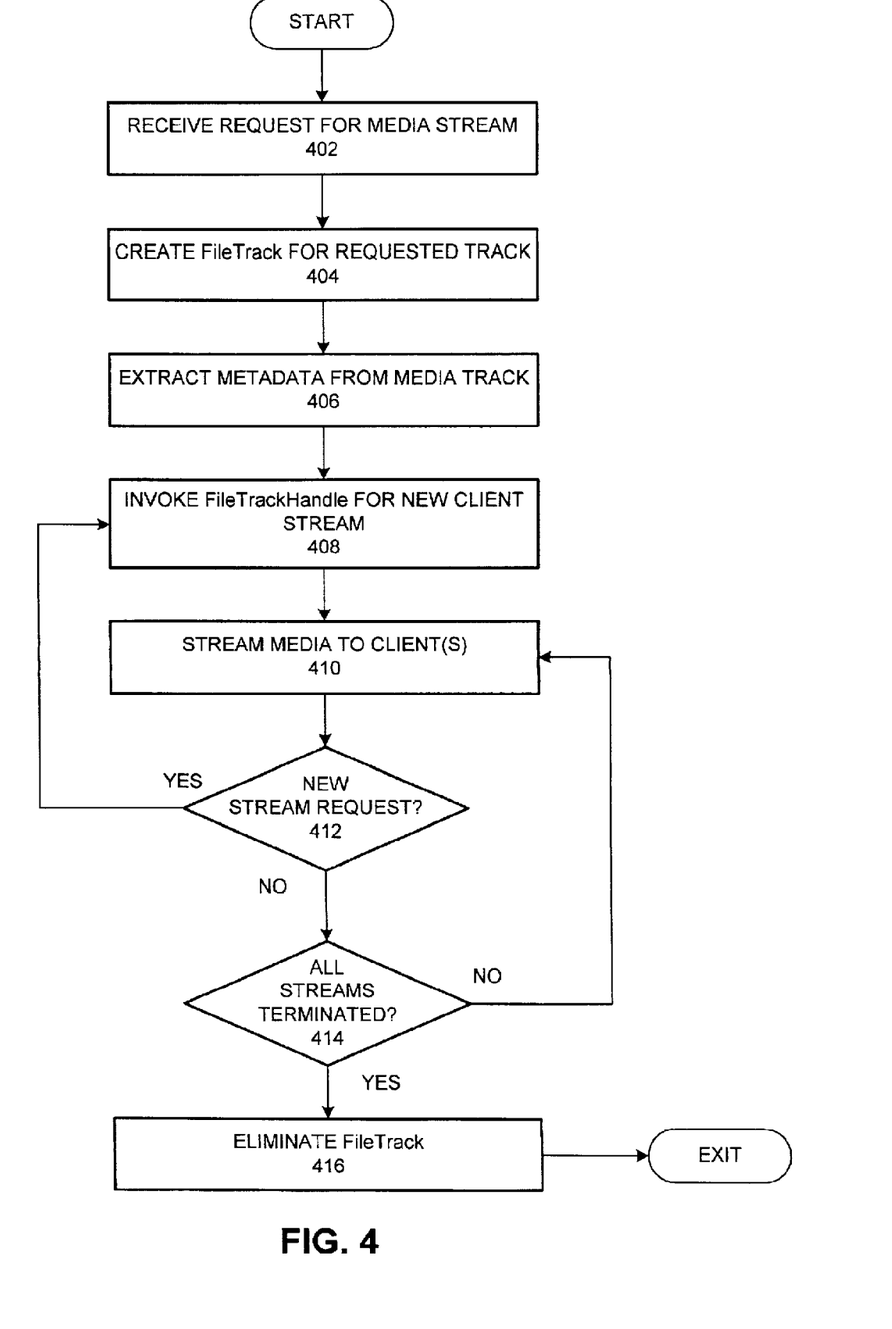
FIG. 4 comprises a flowchart demonstrating one method of streaming a media track to multiple clients with a single copy of the track's metadata in accordance with an embodiment of the present invention.

FIG. 4 demonstrates a method of serving streams of media from one track to multiple clients while maintaining only one copy of the media's metadata, according to one embodiment of the invention. In this method, the same media may be streamed to each client, but with different timing. That is, different client streams may, at any given time, be streaming media from different time indices within the media track.

In state 402 of the illustrated procedure, a request is received to stream some pre-recorded media that is not already being streamed. The request may, for example, be received as an RTSP command to setup and play a particular media track. Other forms of requesting media may be used for other protocols or forms of media.

In state 404, the media streaming server creates a Track object to manage shared access to the requested media's metadata. The illustrated procedure indicates the creation of a FileTrack object, which as described above, may be configured for pre-recorded media programs and tracks.

In state 406, the FileTrack object extracts and stores the metadata from the media track. The FileTrack object may have to parse one or more files containing the media track in order to assemble the metadata.

In state 408, a FileTrackHandle is generated for the new client stream, to map or interface between the stream-specific client context and the track-specific metadata held by the FileTrack object. The FileTrackHandle object may be provided with one or more references to the assembled metadata (e.g., different references for different tables or different types of metadata). In addition, the FileTrack-Handle is allocated a file descriptor or similar resource to facilitate its access to the file(s) containing the media (e.g., to find and extract media to be streamed).

In state 410 the requested media is streamed to the new client. The client may issue commands to control the stream—e.g., to rewind or fast forward to locate a particular part of the media, to pause the streaming, etc.

In state 412, while the media is being streamed to one or more clients, the media streaming server is alert for any new requests for the same media. If a new request is received, the illustrated procedure returns to state 408 to set up a new FileTrackHandle object and a new stream. Otherwise, the procedure continues at state 414.

In state 414, the media streaming server determines if all client streams of the media have been terminated. The server may make this determination, for example, whenever a client stream is terminated. Illustratively, when a client stream is terminated, its associated FileTrackHandle object is deleted. If any streams are still in user or established, or if any new streams are in the process of being set up, the procedure returns to state 410. Otherwise, the procedure continues at state 416.

In state 416, after all client streams have ended the FileTrack object is deleted and the metadata is removed from memory.

One skilled in the art will appreciate that the procedure depicted in FIG. 4 is just one method of sharing a single set of media track metadata for multiple client media streams. Other suitable methods may be derived from the foregoing description without exceeding the scope of the invention.

Resynchronizing Media During Streaming

In one embodiment of the invention, a system and methods for resynchronizing a media stream are provided. In this embodiment, a media stream is considered to be out of synchronization if media for one or more tracks in the program or event being streamed are not being streamed fast enough to keep pace with the time index of the stream. In other words, a streamed media program's current time index is the time index for which all tracks should be sending corresponding media. If the media for a particular track lags behind the current time index, or no media is being streamed at all for the track, then the stream may be considered out of synchronization. Loss of synchronization may occur, for example, if a source of a track's media (e.g., a storage device, a live media feed) cannot supply the media at a fast enough rate.

When synchronization is lost, a media streaming server may attempt to resynchronize the media stream by selecting a new, later, media time index at which to resume streaming. The server then requests or awaits media corresponding to the new time index and, until the new time index is reached, the server may cease streaming or may continue streaming media that is ready to be transmitted (e.g., for a track that is still synchronized).

When the new time index is reached, if the necessary media is received the media streaming server commences streaming the corresponding media. If, however, the media corresponding to the new time index is not available when the new time index is reached, the server may make another attempt to resynchronize at another, later, new time index and may allow more time for retrieval of the corresponding media. Attempts to resynchronize a media stream may be performed a configurable number of times, and the server may terminate the stream if all attempts are unsuccessful.

Figure 5:
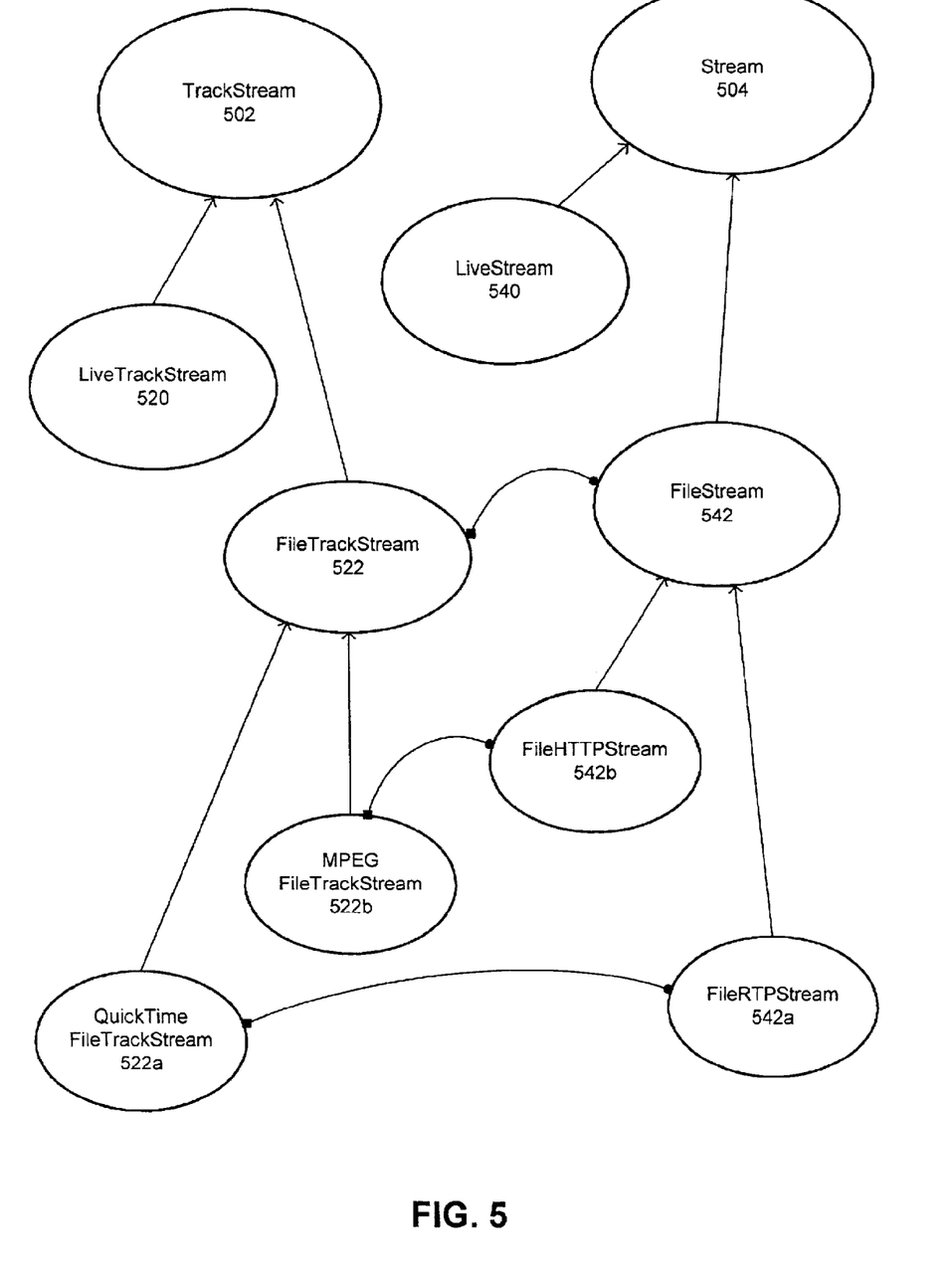
FIG. 5 depicts one configuration of program objects for resynchronizing media within a media stream, in accordance with an embodiment of the present invention.

FIG. 5 depicts several program objects that may cooperate to facilitate resynchronization of a media stream in one embodiment of the invention. Appropriate corresponding program modules configured to operate similarly to the illustrated program objects may be established for computer systems using non-object oriented methods of programming.

In FIG. 5, TrackStream 502 represents a class of objects configured to process a media track's data for streaming to a client. LiveTrackStream 520 represents a TrackStream class of objects configured for streams of live media, while FileTrackStream 522 represents a TrackStream class of objects configured for pre-recorded or other stored media. A TrackStream object may include interfaces for retrieving specific track media (e.g., for a specified time index). From FileTrackStream 522, different types of FileTrackStream objects may be instantiated or invoked for specific forms of media, such as QuickTime FileTrackStream 522a for QuickTime media and MPEG FileTrackStream 522b for MPEG media.

In one embodiment of the invention, program objects depicted in FIG. 5 may cooperate with objects such as those depicted in and described in conjunction with FIG. 3. In particular, in this embodiment a FileTrackStream object may include or reference a FileTrackHandle object for seeking specific locations in a media file, reading data from the file, etc.

Stream 504 is an abstraction of a media stream to a client. Different types of media streams may be represented by, for example, LiveStream 540 for a stream of live media and FileStream 542 for a stream of pre-recorded media. For different media protocols or forms, different types of stream objects may be created to handle the streaming. Thus, in FIG. 5, FileRTPStream 542a is configured to stream media to clients through RTP, while FileHTTPStream 542b is configured to stream media through HTTP.

In the illustrated embodiment of the invention, each Stream object includes methods to start, stop, pause and otherwise control a media stream (e.g., in response to client commands). A Stream object has one or more sockets with which to communicate with a client, and interacts with, or may even include, a TrackStream object to retrieve media data for streaming. Illustratively, and because a media stream may comprise multiple tracks, each Stream object may be associated with, or include, multiple TrackStream objects. For example, if FileRTPStream 542a is created to stream to a client a basic audiovisual media program consisting of one audio track and one video track, FileRTPStream 542a may interact with or include separate FileTrackStream objects for each track. As described below, when a track within a media stream gets out of synchronization, the Stream object controlling the streaming may initiate a resynchronization procedure.

In one embodiment of the invention, a client connects to a media streaming server to request a pre-recorded media program, and a Stream object of the appropriate type or configuration, such as FileRTPStream 542a is generated to control the streaming of the media. FileRTPStream 542a initiates or invokes one or more TrackStream objects of the appropriate type, such as QuickTime FileTrackStream 522a. The FileTrackStream object(s) then create or invoke Track or TrackHandle objects of the appropriate type or configuration (e.g., as depicted in FIG. 3) to access and retrieve media from the program's track(s). In this embodiment, the Stream object controls the streaming (e.g., starting, stopping, pausing) and resynchronizes the stream if necessary. The TrackStream object(s) control the retrieval of track media by initiating appropriating tasks and/or invoking interfaces provided by the Track or TrackHandle objects (e.g., to locate media data, read data from a media file).

Figure 6:
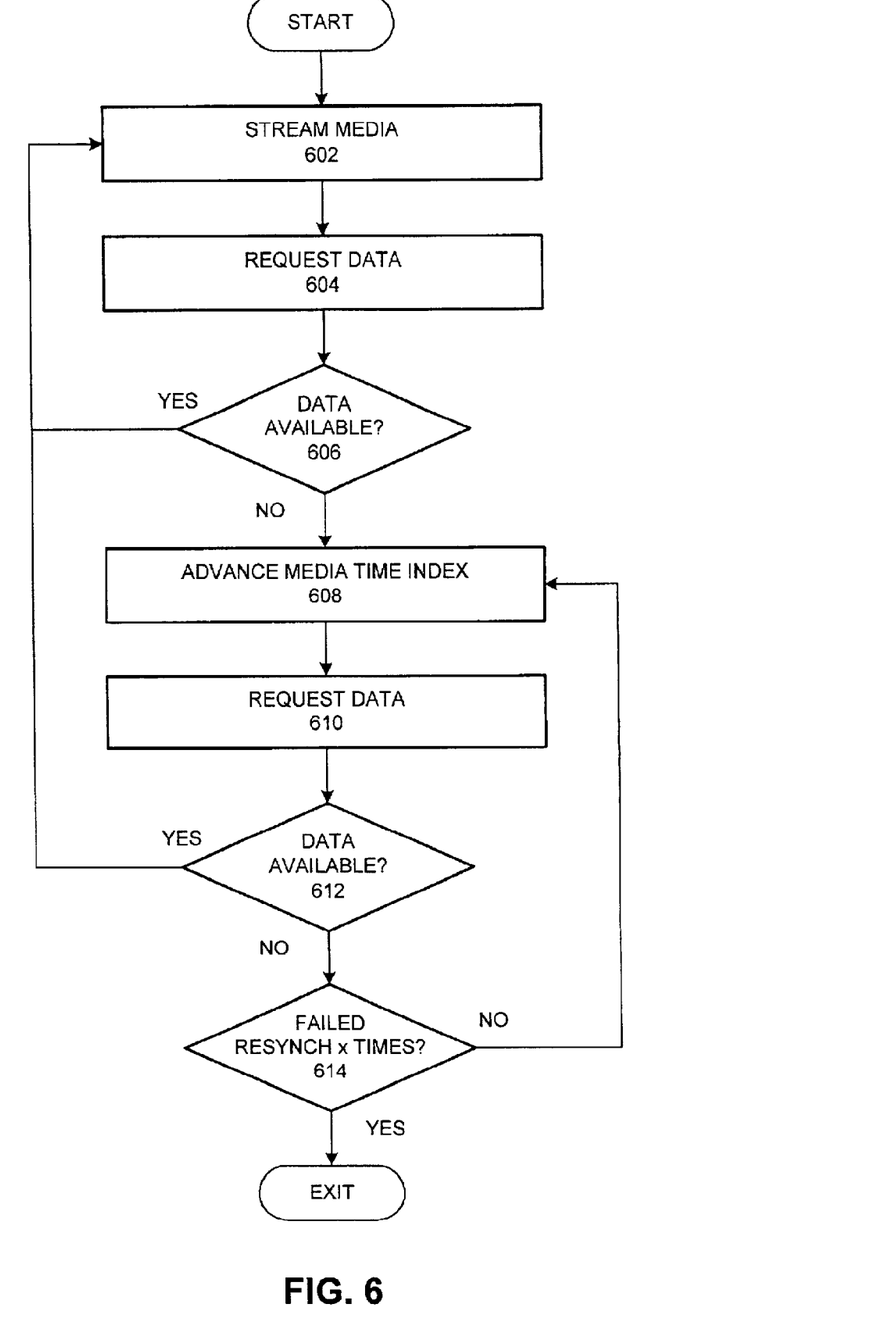
FIG. 6 is a flowchart demonstrating one method of resynchronizing media within a media stream in accordance with an embodiment of the present invention.

FIG. 6 demonstrates the resynchronization of a media stream according to one embodiment of the invention. The media to be streamed in the illustrated procedure is pre-recorded and is therefore retrieved from one or more storage devices, but the procedure may be readily modified for live media received from a live event or other server. In state 602, a pre-recorded media program comprising multiple tracks is being streamed to a client by an assigned Stream object (e.g., FileRTPStream 542a of FIG. 5).

In state 604, a request is made or scheduled (e.g., by QuickTime FileTrackStream 522a of FIG. 5) to read media data for one of the program's tracks from a media file. Illustratively, the requested media data corresponds to an upcoming media time index (e.g., movie time). While waiting for the requested data, the Stream object may stream media data that is already available (e.g., because it was retrieved earlier), for the same or a different track, or may wait until the requested data should be available.

In state 606, the Stream object determines whether the requested data is available, or may be automatically woken or otherwise alerted when data is received. If the requested data has been received, then the procedure returns to state 602 to stream the media data at the appropriate media time index. In particular, if media data for the program's tracks is received in a timely fashion, the Stream object may stream the data at the corresponding media time index, thereby keeping the media program synchronized. If the Stream object determines in state 606 that the requested data is not available (e.g., a storage device is over-burdened), thus indicating a loss of synchronization, the procedure advances to state 608.

In state 608, the Stream object advances or increments the current media time index to a future time index and, in state 610, requests media data corresponding to that future index. Thus, in this embodiment of the invention, the media streaming server opts to drop or ignore data corresponding to the media time between the current and future time indices. Illustratively, any such data (e.g., for a track that has not lost synchronization) may be discarded. The Stream object then goes to sleep or waits an appropriate amount of time for the requested media to be received.

In state 612, the Stream object determines whether the media data corresponding to the new media time index has been received and is available for streaming. If so, the Stream object returns to state 602 to stream the media and retrieve the next portion of media.

However, if the media data is not received and available for streaming at the new time index, in state 614 the Stream object determines whether it has failed to resynchronize a threshold number of times (e.g., three). If not, the illustrated procedure returns to state 608 to advance the media time index once again. Each successive time that the time index is advanced, it may be advanced by a larger increment. For example, if the time index is advanced by a period T the first time, the next time it may be advanced 2*T, then 4*T, 8*T, etc. If resynchronization fails a threshold number of times, the Stream object halts the stream and the procedure ends.

One skilled in the art will appreciate that the procedure depicted in FIG. 6 is just one method of resynchronizing a media stream by dropping old media in favor of regaining synchronization at a later time index. Other suitable methods may be derived from the foregoing description without exceeding the scope of the invention.

The amount of media data requested or retrieved each time it is needed may be determined in part by the size or number of available data buffers, the frequency with which data requests are issued, the bit rate at which the media is streamed to a client, etc.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

What is claimed is:

1. A method of synchronizing a media stream, comprising:

streaming media from a media program from a server to a client;

at the server, detecting a loss of synchronization in said media stream at a current media time index by:
identifying a current time index of the media program, wherein said current time index corresponds to media that should be streamed at said current time index; and
comparing said current time index to a time index of said media actually being streamed;

at the server, selecting a second time index later in said media than said current media time index by adding a predetermined amount of time to said current time index; and attempting to synchronize said media at said second media time index.

2. The method of claim 1, further comprising:
if said attempting to synchronize is unsuccessful, repeating said selecting and said attempting a predetermined number of times.

3. The method of claim 2, further comprising terminating said media stream if each of said predetermined number of attempts to synchronize is unsuccessful.

4. The method of claim 1, wherein said selecting a second time index comprises adding a predetermined amount of time to said time index of said media actually being streamed.

5. The method of claim 1, wherein said attempting to synchronize comprises:
determining whether a portion of the media program corresponding to said second time index is available for streaming at said second time index; and
if said media program portion is available for streaming, resuming streaming of the media program at said second time index.

6. A method of resynchronizing a media program streamed to a client from a media server, the method being performed at the media server and comprising:
(a) requesting a first portion of a media program to be streamed to the client, said first media portion corresponding to a first time index of the media program; and
(b) if said first media portion is unavailable for streaming at said first time index, attempting to resynchronize the media program by:
(c) selecting a second time index of said media program later than said first time index;
(d) requesting a second portion of the media program corresponding to said second time index;
(e) halting streaming of the media program until said second time index; and
(f) if said second media portion is available at said second time index, commencing streaming the media program from said second time index.

7. The method of claim 6, further comprising:
(g) if said second media portion is unavailable at said second time index, repeating (b)–(f) for a later time index and another media portion corresponding to said later time index.

8. The method of claim 7, wherein said (b)–(f) are repeated a predetermined number of times and, if said resynchronization attempts are unsuccessful each of said predetermined number of times, terminating said streaming.

9. The method of claim 6, wherein the media program is a pre-recorded media program and said requesting comprises scheduling retrieval of a θ portion of the media program from a storage device.

10. The method of claim 6, wherein said selecting comprises, for a first resynchronization attempt:

determining a current media time index; and adding a predetermined time increment to said current media time index.

11. The method of claim 10, wherein said selecting comprises, for a subsequent resynchronization attempt:

determining a second current media time index; and adding a multiple of said predetermined time increment to said second current media time index.

12. The method of claim 6, wherein said halting comprises discarding media data corresponding to a time index prior to said second time index.

13. The method of claim 6, wherein said streaming the media program from said second time index comprises transmitting to the client media from multiple tracks of the media program, wherein said transmitted media corresponds to said second time index.

14. A computer readable storage medium storing instructions that, when executed by a computer, cause the computer to perform a method of synchronizing a media stream, the method comprising:

streaming media from a media program from a server to a client;

at the server, detecting a loss of synchronization in said media stream at a current media time index by:

identifying a current time index of the media program, wherein said current time index corresponds to media that should be streamed at said current time index; and comparing said current time index to a time index of said media actually being streamed;

at the server, selecting a second time index later in said media than said current media time index by adding a predetermined amount of time to said current time index; and attempting to synchronize said media at said second media time index.

15. A computer readable storage medium storing instructions that, when executed by a computer, cause the computer to perform a method of resynchronizing a media program streamed to a client from a media server, the method being performed at the media server and comprising:

(a) requesting a first portion of a media program to be streamed to the client, said first media portion corresponding to a first time index of the media program; and (b) if said first media portion is unavailable for streaming at said first time index, attempting to resynchronize the media program by:

(c) selecting a second time index of said media program later than said first time index;

(d) requesting a second portion of the media program corresponding to said second time index;

(e) halting streaming of the media program until said second time index; and (f) if said second media portion is available at said second time index, commencing streaming the media program from said second time index.

16. A server for synchronizing a stream of media to a client, comprising:

a stream module configured to control the streaming of a media program to a client;

a media time index configured to identity a current time index of the media program, wherein for each said time index a corresponding portion of the media program should be streamed; and a first track stream module configured to retrieve media for a first track of the media program from a media source;

wherein if a first portion of the media program is unavailable for streaming at a first current time index, said stream module:

advances said media time index from said current time index to a future time index;

requests said portion of the media program corresponding to said future time index; and resumes said streaming at said future time index if said requested media program portion is available for streaming at said future time index.

17. A media server for synchronizing a media stream to a client, comprising:

a first track of a media program stored on a first storage device;

a first track stream module configured to retrieve media from said first media track, wherein the media comprises multiple media portions corresponding to successive time indices at which said corresponding media portions should be played;

a stream module configured to control streaming of the media to a client by transmitting to the client media corresponding to a current media program time index; and a synchronization module configured to synchronize said media streaming when a portion of the media corresponding to a first current media program time index is not available for streaming at said first current media program time index.

18. The media server of claim 17, wherein said synchronization comprises:

selecting a second current media program time index that is later than said first current media program time index;

requesting a portion of the media corresponding to said second current media time index;

suspending said media streaming until said second current media time index; and if said requested media portion is available for streaming at said second current media time index, resuming said media streaming.

19. A method of synchronizing a media stream, comprising:

streaming media from a media program from a server to a client;

at the server, detecting a loss of synchronization in said media stream at a current media time index by:

identifying a current time index of the media program, wherein said current time index corresponds to media that should be streamed at said current time index; and comparing said current time index to a time index of said media actually being streamed;

at the server, selecting a second time index later in said media than said current media time index; and attempting to synchronize said media at said second media time index by:

determining whether a portion of the media program corresponding to said second time index is available for streaming at said second time index; and if said media program portion is available for streaming, resuming streaming of the media program at said second time index.

20. The method of claim 19, further comprising:
if said attempting to synchronize is unsuccessful, repeating said selecting and said attempting a predetermined number of times.

21. The method of claim 20, further comprising terminating said media stream if each of said predetermined number of attempts to synchronize is unsuccessful.

22. The method of claim 19, wherein said selecting a second time index comprises adding a predetermined amount of time to said current time index.

23. The method of claim 19, wherein said selecting a second time index comprises adding a predetermined amount of time to said time index of said media actually being streamed.

24. A computer readable storage medium storing instructions that, when executed by a computer, cause the computer to perform a method of synchronizing a media stream, comprising:

streaming media from a media program from a server to a client;

at the server, detecting a loss of synchronization in said media stream at a current media time index by:
identifying a current time index of the media program, wherein said current time index corresponds to media that should be streamed at said current time index; and
comparing said current time index to a time index of said media actually being streamed;

at the server, selecting a second time index later in said media than said current media time index; and attempting to synchronize said media at said second media time index by:
determining whether a portion of the media program corresponding to said second time index is available for streaming at said second time index; and
if said media program portion is available for streaming, resuming streaming of the media program at said second time index.

* * * * *

UNITED STATES PATENT AND TRADEMARK OFFICE
CERTIFICATE OF CORRECTION

PATENT NO. : 6,857,130 B2
DATED : February 15, 2005
INVENTOR(S) : Srikantan et al.

It is certified that error appears in the above-identified patent and that said Letters Patent is hereby corrected as shown below:

Column 12,
Line 64, delete "$\Theta$".

Signed and Sealed this

Tenth Day of May, 2005

JON W. DUDAS
*Director of the United States Patent and Trademark Office*